Jan. 9, 1934.   A. SUTHERLAND   1,942,882
MILKING APPARATUS AND PROCESS
Filed Oct. 23, 1931
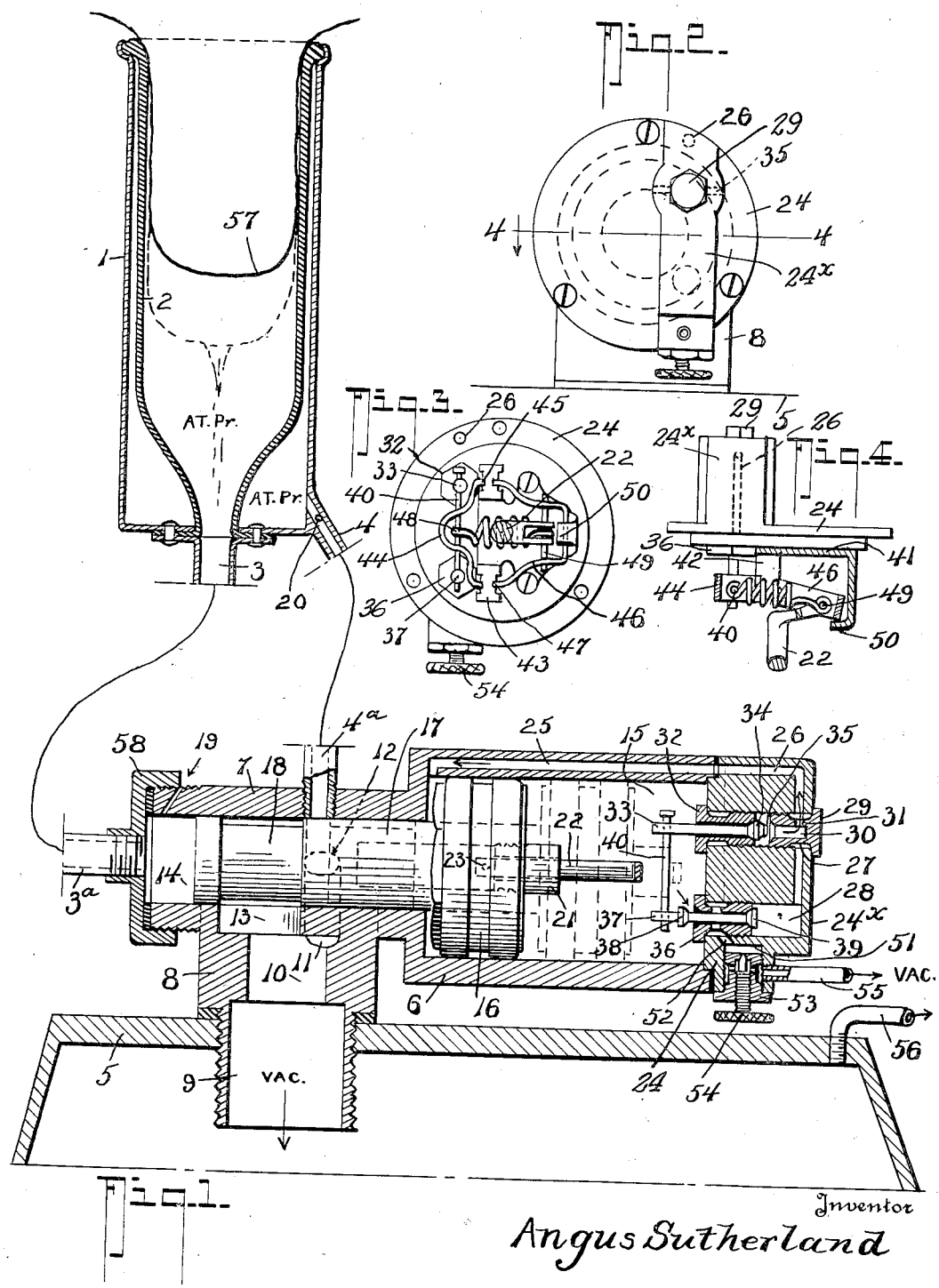
Inventor
Angus Sutherland
By Albert E. Dieterich
Attorney Patented Jan. 9, 1934

1,942,882

UNITED STATES PATENT OFFICE 1,942,882

MILKING APPARATUS AND PROCESS

Angus Sutherland, Vancouver, British Columbia, Canada

Application October 23, 1931. Serial No. 570,699

3 Claims. (Cl. 31—62)

This invention relates to improvement in machine and power milking systems as used in up-to-date dairy barns supplying commercial demands for milk.

My improvements are particularly directed towards improving the action of milking machines in their final effect upon the cattle that are subjected to these operations.

Another particularly object of my invention is to eliminate certain objectionable features and actions found in ordinary milking systems in vogue today using rubber inflation teat cups.

Still another object of my invention is to provide a method of milking that in its action upon the cow resembles more nearly the natural act of a calf sucking.

This nature-like action is particularly beneficial to the cattle and removes many objections to power milking systems, some of which have been responsible for harsh action, thereby causing inflammation and hardening of the teats and bringing about a naturally curtailed supply of milk.

To a more thorough understanding of this problem it is deemed prudent to recite some of the more common faults found in power milking systems of today.

In those milking systems using metal teat cups, the cups are of various sizes and generally slightly conical in shape and some are provided with a rubber or resilient ring at the larger end. These cups are placed on the cow's teats and the machine started. As the vacuum rises in the teat cup, the milk is caused to flow and the teat is naturally drawn further into the cup through the natural resiliency of the teat, with the consequence that the end of the teat becomes somewhat compressed, thus compressing the natural milk channel of the teat and making it harder for the milk to flow.

Furthermore, the vacuum in such systems is not continuous and is generally intermittent by reason such vacuum pumps are only single acting with the consequence that when the vacuum is shut off by the action of the machine, the vacuum is also shut off from the end of the teat, causing the milk flow to stop, but the vacuum continues upon the walls of the teat at the upper end as the vacuum is continuous at this point by reason of the end of the teat having become firmly wedged into the lower portion of the cup under the action of the vacuum drawing it tightly in and sealing the vacuum above it.

This action is hard and harsh on cows and results in lessened milk flow, and such systems are being rapidly replaced by those using combination teat cups having rubber inserts, as such systems provide a massaging action upon the teats that the farmers have come to realize is both beneficial and natural to the cattle and does more nearly resemble the action of a calf sucking than does the other system just recounted.

But such systems have faults peculiarly their own owing to the manner in which the vacuum is applied, and these results I will now attempt to point out.

In these milking systems using rubber inflation the teat cups consist of two parts, first the outer metal shell, second the rubber sleeve lining the cup and more commonly called the inflation.

The cups attached to the milk line are applied firmly to the teats and the milk line connected to the milk bucket which in turn is connected to the vacuum line and is under vacuum when the machine is started.

When the machine is first started and vacuum created inside the teat cup shell and rubber inflation, the teat inside the cup is of normal dimensions, but as the vacuum continues, it causes the teat to expand and become enlarged by inflammation in an endeavor to meet the walls of the inflation and thereby shut off the vacuum, and this enlargement of the teat continues so long as the teat cup is applied and the vacuum continues.

After the milking period is over and the teat cups removed, the teat gradually loses its inflammation and again becomes normal, but the effect of such, however, is to cause hardening or toughening of the teat to a degree beyond normal and in a sense the cow loses a measure of its sensitiveness in its teats and also its responsiveness to milking and withholds a portion of its milk.

Now, the action of the vacuum pump, acting through the pulsator, is to set up a vacuum within the rubber inflation of the teat cup and, of course, upon the teat in the cup which causes the milk to flow, and this vacuum is continuous during the whole of the milking period, although not supposed to be.

Immediately preceding the creating of the vacuum within the teat cup, a vacuum is created within the metal outer shell and on the outer walls of the rubber inflation, but this vacuum is pulsating or alternating under the action of the pulsator, so that when the vacuum is broken within the metal outer shell (not inside the rubber inflation) by the collar on the end of the piston 17 closing port 4a, it causes the inflation to collapse beyond the end of the teat, and the inner walls of the inflation are drawn together and temporarily shut off the milk flow, but does not shut off the vacuum on the teat within the cup; because what happens is that the vacuum is sealed within the collapsed inflation and therefore exists completely over the end and exterior of the teat at all times during milking operation.

Thus, the vacuum is maintained on the teat at all times during milking operations. The vacuum is merely pocketed in between the collapse of inflation and the teat and there is no zero period on the teat at any time during milking operations. The zero period is between the pulsator and teat cup in the pulsator line, or between the pulsator and teat cup inflation on the outside of the inflation and between teat cup shell, and not on the main vacuum or milk line.

If a vacuum gauge were inserted into the teat cup during milking operations, it would show and prove that the vacuum is never broken on the teat during milking, but that the vacuum is continuous at this point.

This action is a vital fault found in all milking systems in vogue today, and one which my invention is specifically designed to eliminate, as such action is neither natural nor good, as experience amply proves that the more kindly and gently cows are treated, the better the results obtained in both quantity and quality of milk supplied.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, and illustrated in the accompanying drawing, in which:

Figure 1 is a view showing a teat cup in vertical section, and showing a pulsator in vertical section cooperative with the teat cup, the parts being in the position where atmospheric pressure (At. Pr.) is present in the teat cup and showing in dotted lines the position of the parts when suction is being applied to the teat cup.

Figure 2 is an end elevation of the pulsator looking from right to left in Figure 1.

Figure 3 is a front elevation of the cylinder head and the toggle valve shifter, a portion of the trigger rod being shown in section.

Figure 4 is a top plan view of the cylinder head, parts carried thereby being shown in section on the line 4—4 of Figure 2.

In the drawing, in which like numerals of reference indicate like parts in all the figures, 1 represents an ordinary metal teat cup as used with rubber inflation 2. In order to carry out my invention I provide the outer shell with a small balanced air vent 20, the purpose of which will be explained later.

I also prefer to use a very flexible inflation 2 of soft rubber in the cup as with such inflation it will snugly fit the small teats and naturally expand to accommodate the larger teats, and in consequence the only part of the teat in this case to which the vacuum can be applied is naturally the end of the duct. Such an inflation being a snug fit at all times more nearly resembles a cow's mouth closed on the teat than does the ordinary types of inflation commonly sold.

In the drawing the cow's teat has been indicated by the reference numeral 57.

By experimentation and research I am able to prove that the more nearly we can simulate the natural action of the calf sucking the better result is attained in any milking system or method, and my method is directed to such simulation.

When a calf is feeding the natural action of the calf's mouth is to snugly surround the teat and to draw the milk from the udder the calf has to set up a vacuum by sucking, but this vacuum is by no means continuous as the calf has to break down the vacuum to swallow and therefore breaks the vacuum on the teat and also the milk duct, and to this action the mother cow is very responsive.

My invention therefore provides a pulsator that gives the feature of breaking down the vacuum in the milk line 3—3a as well as the pulsator line 4—4a, as this will naturally give a zero or atmospheric pressure on the teat as well, with each pulsation and so leave the teat normal.

With my method of milking, when the vacuum is applied in the milk line 3—3a and also the pulsator line 4—4a (see dotted lines, Figure 1) the inflations 2 stay normal, and likewise when air is admitted to the milk line and pulsator line the inflation stays normal.

By means of the provision of a small air vent at 20 a difference of vacuum pressure is created between the inside and the outside of the inflation 2, and thus causes a slower response to collapse of the inflation than would otherwise be the case, as the vacuum is not as high on the outside of the inflation by reason of the small air vent 20; although with my apparatus and method a complete collapse of the inflation is prevented by reason of breaking the vacuum in the main vacuum or milk line 3—3a simultaneously with the breaking of the vacuum in the pulsator line 4—4a, but the vacuum break in the pulsator line is preferably quicker than in the milk line by reason of the small air vent 20. By providing a small air vent 19 in the milk line at the pulsator and providing a screw cap 58 with compressible packing the area of the vent 19 may be regulated more or less to balance the vent 20, so that a fine adjustment of the operative vacuums can be had to suit the requirements to the particular apparatus.

The pulsator consists generally of a cylinder 6 having a neck 7 provided with a coupling 8 threaded at 9 into the top of the milk bucket 5 in which bucket a vacuum is established constantly during the milking period by means of a suitable vacuum pump connected at 56. The cylinder 6 and neck 7 are provided with chambers 15 and 14, respectively, in which the piston 16 and the pulsator plunger 17 respectively operate.

10 is a passage in the coupling 8 which communicates with a port 13 to the chamber 14.

The plunger 17 has an annular groove 18 about equal to the length of the port 13, the purpose for which will presently appear, and a tubular plug 21 is threaded into a blind bore in the end of the piston 16 to carry the valve trigger rod 22, there being a stop pin 23 within the pulsator piston to limit the outward movement of the rod 22, the inward movement thereof being limited by the part of that rod which is forked and connected to the pin 49 of the toggle switch hereinafter again referred to.

24 is the cylinder head which has a duct 26 registering with the duct 25 that leads to the front end of the chamber 15 in advance of the piston 16. It also effects communication between the valve chambers 27 and 28, as will be clear by reference to Figure 1. The valve chamber 27 is provided with two valve plugs 29 and 32, respectively. The valve plug 29 has a chamber 30 that communicates with the duct 26 through the port 31. The plug 32 has a passage in which the valve stem 33 loosely fits, the stem 33 carrying a duplex valve 34 which cooperates with a valve seat in each of the adjacent ends of the valve plugs 29 and 32 depending upon the position of the rod 33. 35 is an air vent from the valve chamber 27 between the adjacent ends of the plugs 29 and 32 (see Figures 1 and 2).

36 is a valve plug having a valve seat at each end and in which the valve rod 37 is loosely fit, the rod 37 carrying the valve heads 38 and 39 to cooperate with the respective valve seats of the plug 36, the plug 36 having an annular groove and ports which communicate through a port 52 with the throttle chamber 51.

The rod 40 passes through a rocker 44 which is fulcrumed at 45 to the notched bearing parts 43 of the arms 42 which are carried by the valve shifter mounting plate 41 that is secured to the cylinder head 24.

46 is the actuating rocker of the toggle switch which is fulcrumed at 47 to the bearings 43 and which is connected with the rocker 44 by a coil spring 48 that is attached to the pin 40 and to a second pin 49 that passes through the rocker 46 and through the bifurcated end of the trigger rod 22. The rod 22 has its end bifurcated (see Figures 3 and 4) and pierced to receive the pin 49, the spring 48 having its end passed into the bifurcation and looped around the pin 49 (see Figure 4).

In order to prevent the actuating rocker 46 from being moved forwardly too far a stop 50 is provided and carried by the mounting plate 41, as best shown in Figures 3 and 4 of the drawing. The toggle valve actuating switch is omitted in Figure 1 for purpose of clarity of illustration. When the rod 22 moves upwardly in Figure 4 (left to right in Figure 1) and pushes member 46 up against member 41, the spring 48 will lie above the fulcrums of 46 and 44 on 43 (Figure 3); consequently the pull of the spring 48 will move rod 40 upwardly in Figure 4 (left to right in Figure 1) and push valve stems 33 and 37 inwardly. Conversely when rod 22 is pulled down in Figure 4 (right to left, Figure 1) the reverse action on stems 33 and 37 takes place. The actions of the switch are snap actions due to the toggle effect. Rod 22 is moved from right to left in Figure 1 when pin 23 is engaged by plug 21.

A throttle valve seat plug 53 is threaded into the chamber 51 and controls the connection to the vacuum pump 55 by means of a needle valve 54.

By reference to Figure 1, it will be seen that when the parts are in the full line position no vacuum is on the teat cup either inside the inflation 2 or outside the inflation 2. At the time the piston is in the position shown in Figure 1 the toggle mechanism will be in the position shown in Figure 4, and will have pulled the valve stems 37 33 to the left in Figure 1, thereby closing the passage through the plug 32 and opening the passage through the plug 29 and also closing the passage from the plug 36 to the chamber 28 and opening the passage from the chamber 15 through the plug 36 and port 52 to the chamber 51. Thus vacuum is established in the chamber 15 which will pull piston 16 from left to right in Figure 1. The vacuum pull is aided by atmospheric pressure acting on the rear of the piston 16 through channels 25 and 26 and port 31 from air vent 35. When the piston 16 leaves the full line position and travels toward the dotted line position it will immediately establish communication between the milk line 3—3a via 14 and port 13 with the interior of the bucket 5 and at the same time the piston 17 will open the passage to the pulsator line 4a—4 so that a vacuum or suction is established both inside and outside of the inflation 2. As soon as the piston has traveled sufficiently far from the full line portion in Figure 1 toward the dotted line position to bring the left-hand end of the rod 22 into engagement with the wall at the inner end of the bore in which the plug 21 is screwed, further movement of the piston in the same direction will cause the trigger 22 to push the rocker 46 (up in Figure 4) which immediately causes the valve rods 33—37 to move to their extreme right hand position in Figure 1, and immediately start the reverse movement of the piston. This reversal is effected by the closing of valve 38 on its seat and the moving of valve head 39 off its seat, also by the opening of communication between the chamber 15 and atmosphere via plug 32 and port 35, also the closing of 34 on its seat 29; the vacuum then acts via port 52, plug 36, valve chamber 28, valve chamber 27, duct 26, duct 25, on the front or left end of the piston 16 and moves the piston from right to left back to the full line position in Fig. 1. As soon as the piston 16 again approaches the left hand position shown in Figure 1 it will close communication from the interior of the bucket to the milk and pulsator lines so as to break the vacuum in the teat cup both inside and outside the inflation 2.

As before stated, the ports 19 and 20 are so designed (as to area open to atmosphere) as to produce the most effective difference of vacuum pressure between the inside and outside of the inflation.

By these means I am able to more nearly simulate the action of a calf sucking during the process of milking than can be found in any other system in use today with which I am familiar, with the result that by the use of my apparatus and method a greatly increased flow of milk is assured and all the harsh and objectionable features found in other milking apparatus and systems are removed.

I claim:

1. In a power milking apparatus wherein are provided teat cups, milk and pulsator lines connected therewith, and a pulsator; a pulsator which comprises a cylinder having a piston chamber, a neck having a plunger chamber, a cylinder head and a neck cap, a piston with a plunger operating respectively in said cylinder and neck chambers, said neck having a coupling attachment to a milk bucket, said milk line extending from said teat cup to said neck chamber and being in constant communication with the same, said pulsator line extending from the teat cup to a port provided in the neck and controlled by said plunger, said coupling attachment having a duct communicating with said neck chamber and controlled by said plunger, said plunger having provisions for closing communications between said milk and pulsator lines and said coupling duct when said plunger is in one position and for effecting communication between said coupling duct and said pulsator line when said plunger is in another position, and for effecting communication between said coupling duct and both said milk and said pulsator lines when said plunger is in a third position, and means to reciprocate said plunger and to create a partial vacuum in said coupling duct.

2. In a power milking apparatus wherein are provided teat cups, milk and pulsator lines connected therewith, and a pulsator; a pulsator which comprises a cylinder having a piston chamber, a neck having a plunger chamber, a cylinder head and a neck cap, a piston with a plunger operating respectively in said cylinder and neck chambers, said neck having a coupling attachment to a milk bucket, said milk line extending from said teat cup to said neck chamber and being in constant communication with the same, said pulsator line extending from the teat cup to a port provided in the neck and controlled by said plunger, said coupling attachment having a duct communicating with said neck chamber and controlled by said plunger, said plunger having provisions for closing communications between said milk and pulsator lines and said coupling duct when said plunger is in one position and for effecting communication between said coupling duct and said pulsator line when said plunger is in another position, and for effecting communication between said coupling duct and both said milk and said pulsator lines when said plunger is in a third position, and means to reciprocate said plunger and to create a partial vacuum in said coupling duct, said means to reciprocate comprising a suction line connected to said cylinder head, a needle valve in said head controlling the suction, said head and cylinder having ducts therein to connect said suction line with the ends of said piston chamber, said head having a port to atmosphere, valves in said head for controlling said port to atmosphere and said cylinder head ducts so as alternately to place the respective ends of said piston chamber in communication with said suction line and with the atmosphere, and means for actuating said valves.

3. In a power milking apparatus wherein are provided teat cups, milk and pulsator lines connected therewith, and a pulsator; a pulsator which comprises a cylinder having a piston chamber, a neck having a plunger chamber, a cylinder head and a neck cap, a piston with a plunger operating respectively in said cylinder and neck chambers, said neck having a coupling attachment to a milk bucket, said milk line extending from said teat cup to said neck chamber and being in constant communication with the same, said pulsator line extending from the teat cup to a port provided in the neck and controlled by said plunger, said coupling attachment having a duct communicating with said neck chamber and controlled by said plunger, said plunger having provisions for closing communications between said milk and pulsator lines and said coupling duct when said plunger is in one position and for effecting communication between said coupling duct and said pulsator line when said plunger is in another position, and for effecting communication between said coupling duct and both said milk and said pulsator lines when said plunger is in a third position, and means to reciprocate said plunger and to create a partial vacuum in said coupling duct, said means to reciprocate comprising a suction line connected to said cylinder head, a needle valve in said head controlling the suction, said head and cylinder having ducts therein to connect said suction line with the ends of said piston chamber, said head having a port to atmosphere, valves in said head for controlling said port to atmosphere and said cylinder head ducts so as alternately to place the respective ends of said piston chamber in communication with said suction line and with the atmosphere, and means including a toggle snap switch actuated by the reciprocation of said piston for actuating said valves.

ANGUS SUTHERLAND.